March 15, 1932.  W. C. ERWIN  1,849,483
LINE SPOOLING DEVICE
Filed Dec. 20, 1927   2 Sheets-Sheet 2
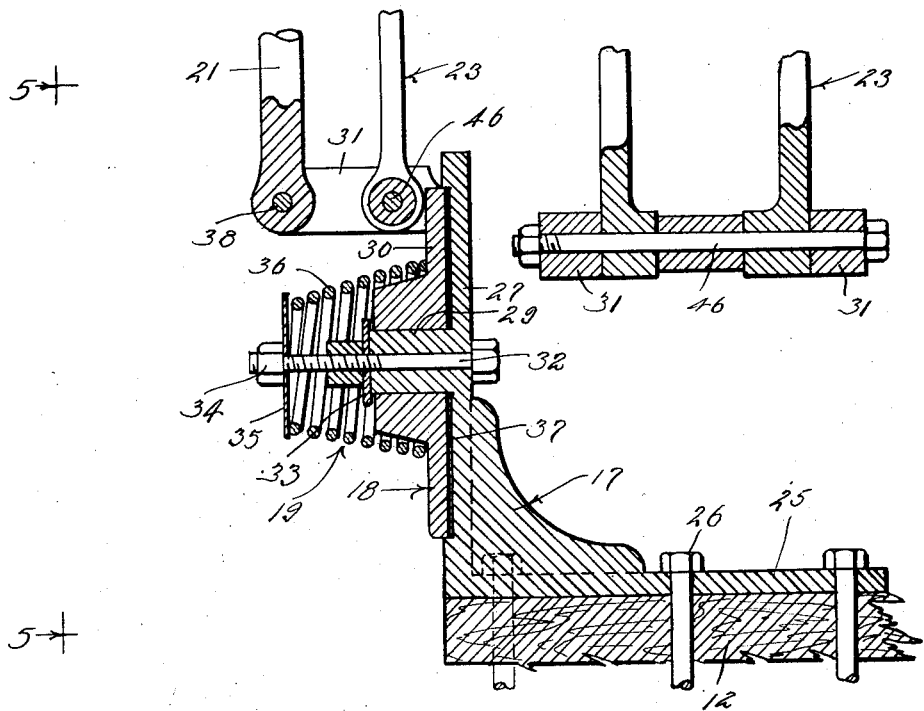
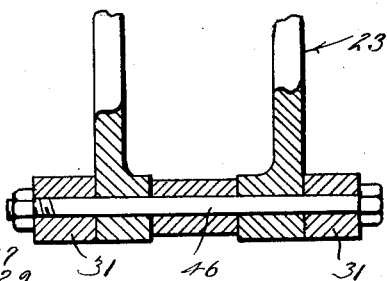
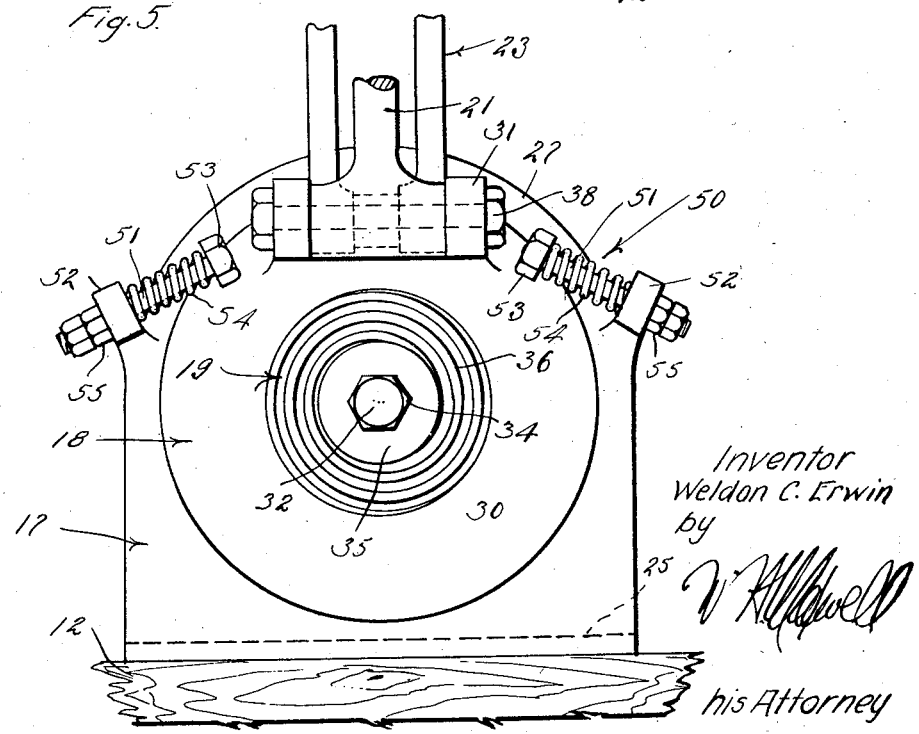
Inventor
Weldon C. Erwin
by
his Attorney Patented Mar. 15, 1932

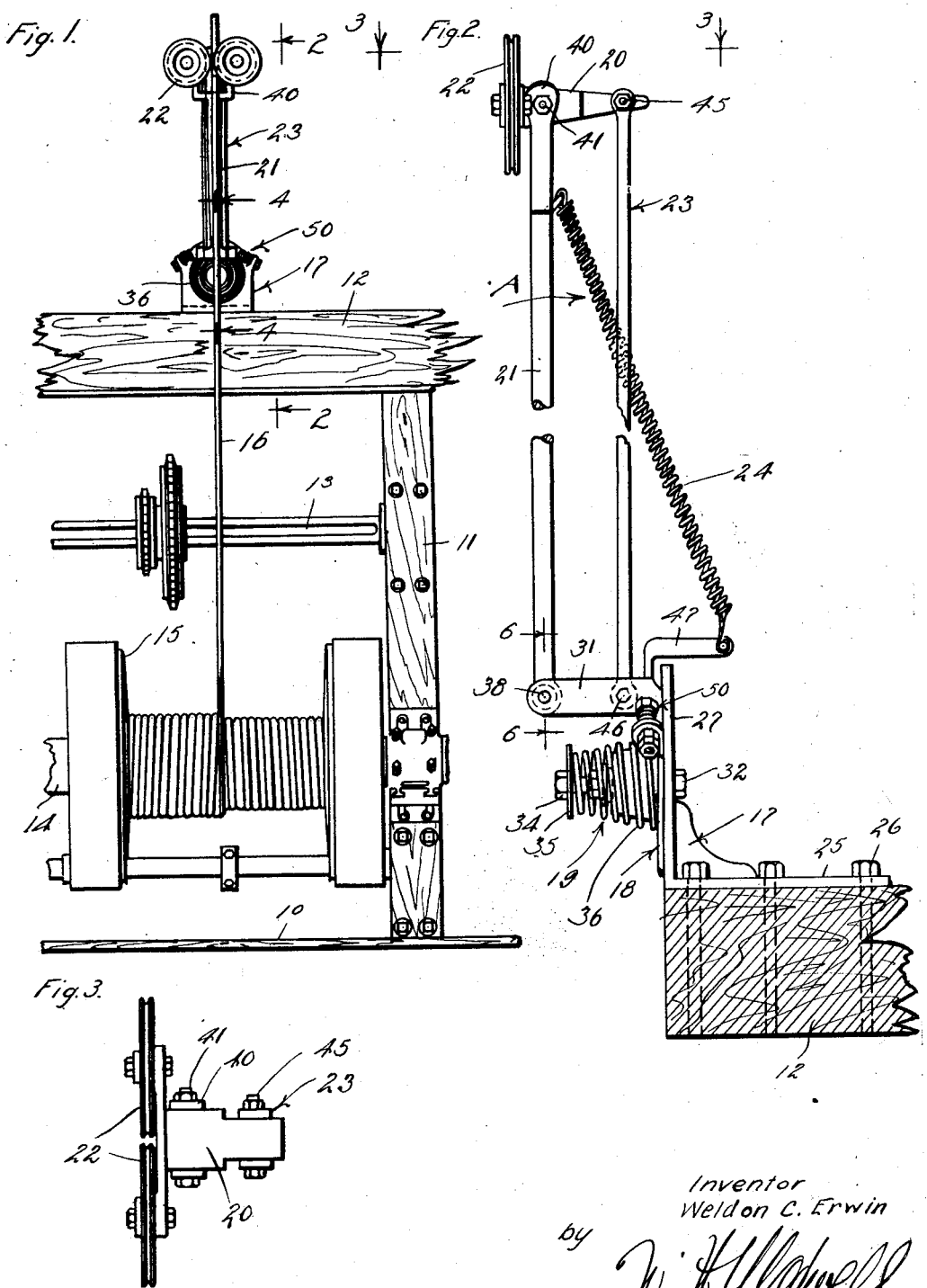

1,849,483

UNITED STATES PATENT OFFICE

WELDON CHARLES ERWIN, OF YORBA LINDA, CALIFORNIA

LINE SPOOLING DEVICE

Application filed December 20, 1927. Serial No. 241,441.

This invention has to do with a line spooling device, and it is a general object of the invention to provide a simple, practical and improved device for feeding or guiding a line onto a reel or drum.

In various situations where a line or cable is wound onto a spool or drum, it is desirable or necessary to provide a feeding or spooling device for the line so that it winds uniformly onto the drum under the proper tension. For purpose of example, I will refer to the drum and line employed in a well drilling rig. In this case, a flexible steel cable is commonly used and is wound onto a power operated drum. The drum is located adjacent the floor of the derrick and the cable extends from the drum upwardly to the crown block, located in the top of the derrick. In operation, the drum and line are operated or reeled intermittently and at various speeds. In practice, the line seldom applies itself properly or uniformly to the drum, due mainly to the varying loads or tensions on it and to its whipping or vibration which occurs between the drum and crown block.

Various devices have been proposed and used for feeding the line onto the drum of a drawworks. These devices have operated with varying degrees of success.

It is a primary object of my present invention to provide a line spooling device suitable for the class of use above outlined and in which the friction element is of simple design and construction and such that it will maintain an effective and substantially constant friction for a long period of time.

It is another object of this invention to provide a line spooling device of the character mentioned which effectively operates to hold the line to the spool and also hold successive turns of the line together, or in abutting engagement.

Another object of my invention is to provide an effective and reliable means for reversing the direction of feed of the line upon the line reaching the ends of the drum.

The various objects and features of the invention will be best and more fully understood from the following detailed description of a typical form and application of the invention, throughout which description reference is had to the accompanying drawings, in which:

Fig. 1 is a front elevation of a portion of a typical drawworks of a well drilling rig, showing the spooling device provided by my invention arranged in operating position to feed the operating line of the rig onto the drum of the drawworks;

Fig. 2 is an enlarged side elevation of the device provided by my invention, being a view taken as indicated by line 2—2 of Fig. 1;

Fig. 3 is a plan view of the device, being a view taken as indicated by line 3—3 on Fig. 2;

Fig. 4 is an enlarged, detailed, sectional view of the lower portion of the device, being a view taken as indicated by line 4—4 on Fig. 1;

Fig. 5 is a front elevation of the parts shown in Fig. 4, being a view taken as indicated by line 5—5 on Fig. 4; and Fig. 6 is an enlarged, sectional view taken as indicated by line 6—6 on Fig. 2.

The construction or spooling device provided by my invention is applicable, generally, to situations wherein a line or cable is to be fed or directed onto a spool or drum. In view of the fact that the invention is particularly applicable to the spooling of the operating line of a well drilling rig onto the drum of the drawworks of the rig, I have chosen to set forth this specific application of the invention.

In the drawings, I have shown a portion of a typical well drilling rig taken at the drawworks of the rig. Numeral 10 designates the floor of the derrick, 11 an upright or post of the drawworks frame, 12 the top or headboard of the drawworks frame, 13 the drive shaft of the drawworks, 14 the drum shaft of the drawworks, and 15 the drum carried on the drum shaft. The operating cable or line 16 of the rig is shown extending downwardly in front of the head-board 12 of the drawworks frame to wind onto the drum 15. The general arrangement and combination of derrick parts just described is typical of that now commonly used in the drilling of wells and will serve as a typical situation in or to which the device provided by my invention may be advantageously employed.

The line feeding or spooling device provided by my invention is adapted to be mounted on the head-board 12 of the drawworks to engage the operating line at a point somewhat above the drum and is operable to hold the line against the drum and so that successive turns of the line bear laterally against each other as the line is wound onto the drum. The device provided by my invention includes, generally, a base 17, a carrier 18 rotatably supported by the base, means 19 operable to maintain a friction engagement between the carrier and base, a head 20, an arm 21 supporting the head from the carrier, a pair of line engaging pulleys 22 carried by the head, guide means 23 connecting the carrier and head to maintain the head in the proper position, and means 24 normally urging the arm 21 and head 20 in one direction.

The base 17 of the device is adapted to be mounted stationary on a suitable support such as the head-board 12 of the draw works frame. The base 17 is illustrated in the drawings in the form of a casting having a horizontal part 25 to be secured to the top of the head beam 12 by bolts 26, or other suitable means, and a vertically or substantially vertical part 27 having an outer face 28 finished to receive the carrier 18. In the particular construction illustrated in the drawings, the upwardly projecting part 27 of the base has a central lug 29 projecting from the face 28 to support the carrier 18.

The carrier 18 is mounted at the face 28 of the base and includes a disk-shaped body 30 rotatably supported on the lug 29 to engage the face 28 of the base and a bracket 31 projecting outwardly from the body. The bracket 31 of the carrier may include a pair of spaced bracket arms adapted to receive the arm 21 and link means 23, as will be hereinafter described. The body 30 and bracket arms of the carrier are preferably formed integrally, it being preferred to make the carrier a casting.

The means 19 whereby a frictional engagement is maintained between the carrier 18 and base, that is, between the body 30 of the carrier and the face 28 of the base, may include a construction whereby the body 30 of the carrier is held in pressure engagement with the face 28 under a substantially uniform pressure. In the drawings, I have shown the carrier and base connected by a bolt 32 which extends through the part 27 and lug 29 of the base and carries a washer 33 which projects from or overhangs the outer end portion of the lug 29 to prevent displacement of the carrier from the lug. The bolt 32 projects a substantial distance outwardly beyond the end of the lug 29 and carries a nut 34 which holds a second or large washer 35. A spring, preferably a helical spring 36, is arranged between the washer 35 and the body 30 of the carrier so that the nut 34 can be tightened on the bolt 32 to put the spring under compression, thereby causing the body of the carrier to be held in pressure engagement with the face 28 of the base. With this arrangement, various pressures or degrees of frictional engagement can be obtained between the carrier and base by adjusting the nut 34 on the outer end portion of the bolt 32. In practice, a friction washer or lining 37 may be inserted between the body 30 of the carrier and the face 28 of the base.

The head 20 is located a substantial distance above the parts just described and is supported from the carrier 18 by the arm 21, and the link means 23. The lower end of the arm 21 is arranged between the spaced arms of the bracket 31 and is pivotally held by a pivot pin 38. The axis of the pin 38 extends in a direction transversely of that of the axis of the pivotal movement of the carrier 18. The upper end of the arm 21 is yoked to have spaced parts 40 between which the head 20 is arranged. A pivot pin 41, the axis of which is parallel with the pivot pin 38, extends between the parts 40 and through the head 20 to pivotally support the head at the upper end of the arm.

The line engaging pulleys 22 are rotatably mounted in spaced relation on the forward end of the head 20 and are grooved to receive the operating line 16. In practice, the pulleys may be related or spaced so that the line is securely held between them, it being preferred to space or groove the pulleys so that the line will operate in only one pulley at a time. The pulleys 22 are spaced apart horizontally so that the desired line engaging relation of the pulleys is maintained throughout the range of operation or tilting of the arm and head about the axis of rotation of the carrier 18.

The link means 23 is provided to brace the arm and head and to maintain the head 20 in a substantially horizontal position throughout operation of the device. The link means includes a pair of links having their upper ends connected by pivot pins 45 to the rear end of the head and their lower ends pivotally mounted between the arms of the bracket 31 by a pivot pin 46. The links of the means 23 correspond in length to the arm 21 and, therefore, operate in parallel relation with the arm, maintaining the head 20 parallel with the bracket arms 31. Through this construction, the pulleys 22 are maintained in a vertically disposed plane throughout operation of the device.

The means 24 operates to normally urge or swing the arm 21 and, therefore, the pulley carrying head 20 in the direction indicated by the arrow A in Fig. 2 so that the cable guided by the pulleys is held inwardly against the drum 15 with a substantially uniform pressure. The means 24 may comprise a tension spring, for instance, a helical spring connected between the arm 21 and a lug 47 projecting rearwardly from the body of the carrier in the manner illustrated in Fig. 2 of the drawings.

The reversing means 50 provided by my invention operates to limit turning of the carrier 18, and, therefore, swinging of the head 20 about the axis of the carrier so that the device automatically stops and reverses the direction of feed of the line along the drum. This means 50 includes two spaced or oppositely disposed stops 51 carried by the base 17 to be engaged by the carrier 18. In the preferred construction, each stop 51 is in the form of a rod slidably carried by a lug 52 formed on or projecting from the part 27 of the base. The rod is provided at its outer end with a head 53 to be engaged by a suitable part of the carrier, for instance, by the bracket portion 31 of the carrier. In accordance with my invention, a compression spring, for instance, a helical spring 54 is carried on the rod 51 between the head 53 and the lug projection 52 and an adjusting nut 55 is screw-threaded on the rear end of the rod 51 behind the lug projection 52 so that the position of the head 53 can be adjusted. The two units of the stop means are spaced apart on the part 27 and are oppositely disposed, as clearly illustrated in Fig. 5 of the drawings. It will be obvious that the stop means just described operates to stop turning or rotation of the carrier with reference to the base, and is effective in reversing the direction of feed of the line onto the drum. As the carrier turns about its axis and engages the head 53 of one of the stop units, the spring 54 of the unit is put into action or compressed until it tends to stop or reverse the direction of rotation of the carrier with sufficient force to change the direction of feed of the line of the drum 15. It will be apparent that the stop means may be adjusted so that the device is very accurate in its operation.

In operation, the line 16 is arranged through or in the pulleys 22 in the manner shown in Fig. 1 so that the means 24 holds it under the desired tension in pressure engagement with the drum, while the friction maintained between the carrier 18 and the base offers resistance to movement of the line across the drum, thereby causing the line to reel tightly onto the drum. During operation, the arm 21 is free to swing in and out as the strains or tensions on the line require. As the line operates across the face of the drum, the carrier 18 of the device turns relative to the face 28 of the base. It will be apparent how the desired resistance to this turning of the carrier can be obtained through adjustment of the nut 34. By my construction, the principal wear in the device occurs between the carrier 18 and the base and, in view of the construction and arrangement of these parts, this wear is comparatively little and the parts are easily repaired or renewed when necessary.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A line spooling device adapted to be mounted on the head board of the draw works of a well drilling rig having a winding drum, and a line extending thereto which includes, a base to be mounted on the headboard, an arm carried by the base to oscillate axially of the winding drum, friction means to offer resistance to movement of the arm, and line engaging means carried by the arm.

2. A line spooling device adapted to be mounted on the head board of the draw works of a well drilling rig having a winding drum, and a line extending thereto which includes, a base to be mounted on the headboard, an arm carried by the base to oscillate axially of the winding drum, and means tending to tilt the arm in another direction, and line engaging means carried by the arm.

3. A line spooling device adapted to be mounted on the head board of the draw works of a well drilling rig having a winding drum, and a line extending thereto, which includes, a base to be mounted on the headboard, an arm carried by the base to oscillate axially of the winding drum and adapted to tilt in another direction, means normally tending to tilt the arm in one direction, stop means for limiting oscillation of the arm, and line engaging means carried by the arm.

4. A line spooling device adapted to be mounted on the head board of the draw works of a well drilling rig having a winding drum, and a line extending thereto, which includes, a base to be mounted on the headboard, an arm carried by the base to oscillate axially of the winding drum and adapted to tilt in another direction, means normally tending to tilt the arm in one direction, yielding stop means for limiting oscillation of the arm, and line engaging means carried by the arm.

5. A line spooling device adapted to be mounted on the head board of the draw works of a well drilling rig having a winding drum, and a line extending thereto, which includes, a base to be mounted on the headboard, an arm carried by the base to oscillate axially of the winding drum and adapted to tilt in another direction, means normally tending to tilt the arm in one direction, yielding stop means for limiting oscillation of the arm, and line engaging means carried by the arm, the stop means including an adjustable stop member and a cushioning spring in connection with the member.

6. A line spooling device adapted to be mounted adjacent a winding drum having a line extending thereto which includes a base, a carrier pivotally carried by the base, an arm pivotally connected to the carrier, and line engaging means carried by the arm.

7. A line spooling device adapted to be mounted adjacent a winding drum, having a line extending thereto, which includes a base, a carrier pivotally carried by the base, adjustable friction means between the carrier and base, an arm pivotally connected to the carrier, and line engaging means carried by the arm.

8. A line spooling device adapted to be mounted adjacent a winding drum, having a line extending thereto, which includes a base having a projection, a carrier pivotally mounted on the projection, a friction member between the carrier and base, a spring operating to hold the carrier in engagement with the friction member, an arm pivotally connected to the carrier, and line engaging means carried by the arm.

9. A line spooling device adapted to be mounted adjacent a winding drum, having a line extending thereto, which includes a base having a projection, a carrier pivotally mounted on the projection, a friction member between the base and carrier, a spring operating to hold the carrier in engagement with the friction member, adjustable stop means for the carrier, an arm pivotally connected to the carrier, and line engaging means carried by the arm.

10. A line spooling device adapted to be mounted adjacent a winding drum, having a line extending thereto, which includes a base having a projection, a carrier pivotally mounted on the projection, a friction member between the base and carrier, a spring operating to hold the carrier in engagement with the friction member, adjustable spring supported stop means for the carrrier, an arm pivotally connected to the carrier, and line engaging means carried by the arm.

In witness that I claim the foregoing I have hereunto subscribed my name this 15th day of October, 1927.

WELDON C. ERWIN.